Feb. 17, 1959 E. A. STALKER 2,873,946

DAMPERS FOR BLADED WHEELS

Filed June 2, 1954

INVENTOR.

Edward A. Stalker

United States Patent Office 2,873,946

Patented Feb. 17, 1959

2,873,946

DAMPERS FOR BLADED WHEELS

Edward A. Stalker, Bay City, Mich., assignor to The Stalker Development Company, Bay City, Mich., a corporation of Michigan Application June 2, 1954, Serial No. 433,889

9 Claims. (Cl. 253—77)

This invention relates to bladed rotary fluid machinery for exchanging force with a fluid.

An object of the invention is to provide a bladed wheel for turbines, compressors and the like incorporating a damper to damp vibrations of the blades.

Another object is to provide bladed wheels with dampers which exclude resonance vibrations by providing forces which are out of harmony with resonant conditions.

The above objects are accomplished by the means illustrated in the accompanying drawings in which—

Figures 1, 2, 3, 4, 5, 6:
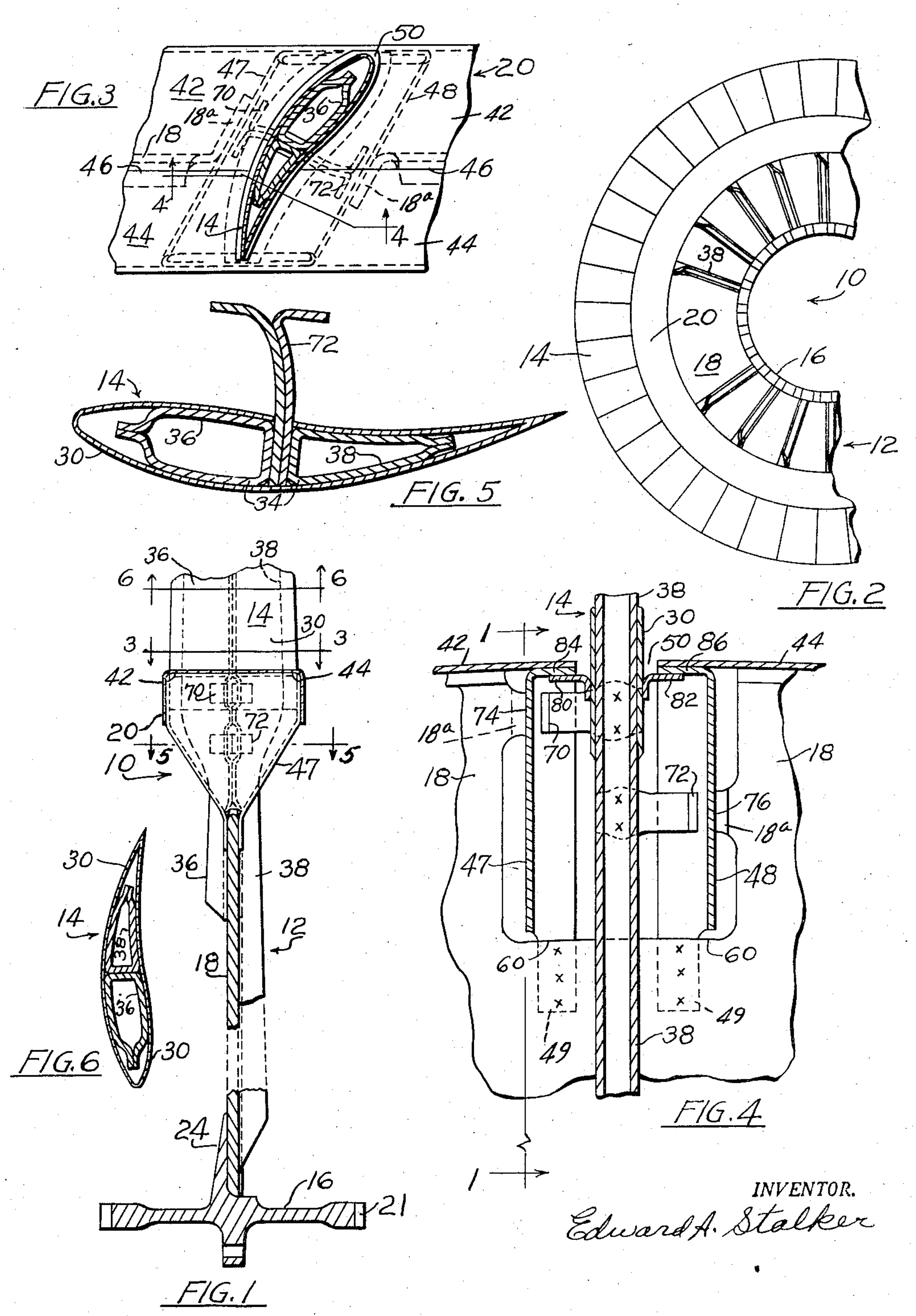
Fig. 1 is a fragmentary axial section through a bladed wheel according to this invention.
Fig. 2 is a front axial view of the wheel of Fig. 1.
Fig. 3 is a fragmentary radial view of a blade of a wheel on line 3—3 in Fig. 1.
Fig. 4 is a fragmentary section on line 4—4 in Fig. 3.
Fig. 5 is a section of a blade and damper on line 5—5 in Fig. 1.
Fig. 6 is a section on line 6—6 in Fig. 1.

In bladed wheels of high speed machines such as compressors, turbines and the like, the blades have a tendency to vibrate and under certain conditions of flow the vibrations build up to such amplitudes that the blades destroy themselves. For instance in axial flow compressors, when the flow separates from the blades on their upper or suction sides a condition of resonance may occur and cause breakage of the blades.

In this invention the blades are arranged so that this condition of resonance will not occur and the vibrations may be said to be damped. Resonance cannot occur because as the blade moves from side to side it contacts stops on each side which are at different radial locations. One or both of these locations is inconsistent with the nodal pattern required for resonance vibration of the blade.

Referring now to the drawings a bladed wheel 10, in this instance a compressor wheel, is illustrated in Figs. 1 and 2. It comprises the hub means 12 and the blade means 14. The hub means may include, as shown, the clutch ring 16, the hub disk 18, and the rim means 20.

The clutch ring provides teeth 21 which mesh with the teeth of rings of adjacent wheels so that they may be stacked in series.

The hub disk 18 is fixed preferably by fused metal to the flange 24 of the clutch ring.

The blade means 14 preferably comprises a blade envelope 30 enclosing a stem means made preferably of two stem parts 36 and 38 in back to back contact as shown in Figs. 1, 3 and 6. The envelope is fixed preferably by brazing to the stem parts along their sides.

In Fig. 2 some of the stem means are omitted for clearness of representation. The blade means however should include a stem means for each blade.

The rim means as shown in Figs. 1 to 4 comprises two annular rings 42 and 44 joined together at the joint 46. These are supported on the disk by the brackets 47 and 48 at each blade.

Each blade means has parts extending through an opening 50 in the rim means as shown in Figs. 1, 3 and 4.

As shown particularly in Figs. 1 and 4 the stem parts of each blade are fixed to opposite sides of the hub disk. These parts are spaced apart at the disk to provide a gap of the thickness of the disk.

The local perimeter 60 of the disk 18 (Fig. 4) is spaced or recessed radially inward from the rim 42, 44 so that if the blade vibrates the principal vibration is with respect to an axis close to this local perimeter. The openings 50 in the rim means have their sides spaced from the blade surfaces by small distances to accommodate movement of the blades from side to side. The disk is formed with bent portions **18*a* shaped to overlie the walls of brackets 47 and 48 respectively, the brackets being secured thereto and to the disk below recess 60 as shown at 49**.

Each blade carries between its stem parts a damper means comprising a damper 70 on one side and a damper 72 on the opposite side at different radial positions for the two as shown in Figs. 1 and 4.

The damper elements are designed to establish periodic contact between the blade means and the hub structure at radially different localities on opposite sides of the blade.

Thus if each blade is forced from side to side, as by turbulent flow across the blade, the dampers 70 and 72 will strike the adjacent wall of bracket 47 at 74 and then the adjacent wall of bracket 48 at 76 for instance. This movement cannot develop into a resonant vibration because the pattern of nodes along the blade span for striking at 74 is not the same as for striking at 76. Accordingly the blade cannot develop resonant vibrations.

It will be clear that the invention provides for the contacting of the blade at different radial points with the hub structure.

The openings 50 are preferably sealed by the seals 80 and 82 which are shown fixed to each blade and press against the flanges 84 and 86 of brackets 47 and 48 respectively under the action of centrifugal force.

Although the damping means of this invention are applicable to various type of construction, this invention is particularly adapted to sheet metal construction. This type of construction can be particularly light in weight if significant blade vibration can be excluded or reduced substantially or the length of operating life can be greatly extended.

Although the invention has been described with respect to a compressor wheel it is to be understood that it is applicable to other types including bladed turbine wheels.

While I have illustrated a specific form in this invention it is to be understood that I do not intend to limit myself to this exact form but intend to claim my invention broadly as indicated by the appended claims.

I claim:

1. In combination in an axial flow bladed wheel to be mounted for rotation about an axis to exchange force with a fluid, a wheel hub structure having a rim, a plurality of aixal flow blades extending radially outward from said rim, each said blade having a part extending radially inward through an opening in said rim in spaced relation thereto and being fixed to said structure at a locality substantially inward from said rim, each said blade tending to vibrate about a said locality during rotation of said wheel, and damper elements positioned on peripherally opposite sides of each said blade at different radial distances inward from said rim and radially outwardly from said locality, said elements being secured to each said blade adjacent but normally spaced from said hub structure to knock on said structure at different radial localities on opposite sides of each said blade to damp vibrations thereof.

2. In combination in an axial flow bladed wheel to be mounted for rotation about an axis to exchange force with a fluid, a wheel hub structure having a rim, a plurality of axial flow blades extending radially outward from said rim, each said blade having a part extending radially inward through an opening in said rim in spaced relation thereto and being fixed to said structure at a locality substantially inward from said rim, each said blade tending to vibrate during rotation of said wheel, and damper means carried by said blades radially inward from said rim and radially outwardly of said locality comprising damper elements adjacent but normally spaced from said hub structure designed for establishing periodic contact between said blade and said structure at radially different positions on opposite sides of said blade.

3. In combination in an axial flow bladed wheel to be mounted for rotation about an axis to exchange force with a fluid, a wheel hub structure having a rim, a plurality of axial flow blades extending radially outward from said rim, each said blade having a part extending radially inward through an opening in said rim in spaced relation thereto and being fixed to said structure at a locality substantially inward from said rim, each said blade tending to vibrate during rotation of said wheel, and damper means secured to said inward part on peripherally opposite sides of each said blade radially outwardly of said locality, each said blade and said damper means associated therewith being positioned adjacent but normally spaced from said hub structure to strike one upon the other at different radial positions on opposite sides of said blades to damp vibrations thereof.

4. In combination in an axial flow bladed wheel designed for mounting for rotation about an axis to exchange force with a fluid, said wheel having a sheet metal hub structure comprising a sheet metal disk and a rim means carried thereon peripherally thereabout, a plurality of axial flow blades extending radially outward from the rim of said rim means, each said blade having a part extending radially inward through an opening in said rim in spaced relation thereto and being fixed to said disk at a locality substantially inward from said rim, each said blade tending to vibrate during rotation of said wheel, and damper means secured to said inward part on peripherally opposite sides of each said blade, each said blade and said damper means associated therewith being positioned adjacent but normally spaced from said hub structure to strike one on the other at different radial positions on opposite sides of said blades radially outwardly of said locality to damp vibrations thereof.

5. In combination in an axial flow bladed wheel designed for mounting for rotation about an axis to exchange force with a fluid, said wheel having a sheet metal hub structure comprising a sheet metal disk and a rim means carried thereon peripherally thereabout, a plurality of axial flow hollow sheet metal blades extending radially outward from the rim of said rim means, each said blade having a part extending radially inward through an opening in said rim in spaced relation thereto and being fixed to said disk at a locality substantially inward from said rim, each said blade tending to vibrate during rotation of said wheel, and damper means secured to said inward part on peripherally opposite sides of each said blade, each said blade and said damper means associated therewith being positioned adjacent but normally spaced from said hub structure to strike one on the other at different radial positions on opposite sides of said blades radially outwardly from said locality to damp vibrations thereof.

6. In combination in an axial flow bladed wheel adapted to be mounted for rotation about an axis to exchange force with a fluid, a hub structure having a rim, a plurality of axial flow blades extending radially outward from said rim, each said blade having a stem means extending radially inward through an opening in said rim and being fixed to said hub structure inwardly of said rim, said blades having a tendency to vibrate in use, and damper elements on opposite sides of said stem means radially inward from said rim, said damper elements being normally spaced from said hub structure and arranged to strike thereagainst upon vibration of said blade to damp said vibrations.

7. In combination in an axial flow bladed wheel adapted to be mounted for rotation about an axis to exchange force with a fluid, a hub structure having a rim, a plurality of axial flow hollow blades extending radially outward from said rim, each said blade having sheet metal stem means extending radially inward through an opening in said rim and being fixed to said hub structure inwardly of said rim, said blades having a tendency to vibrate in use, a plurality of damper elements on each of said stem means located at different radial distances inward of said rim, and brackets on said hub structure inward of said rim having striking surfaces opposite and adjacent but normally spaced from said damper elements respectively to engage said elements and to damp the vibrations of said blades.

8. In combination in an axial flow bladed wheel adapted to be mounted for rotation about an axis to exchange force with a fluid, a wheel hub structure having a rim, a plurality of axial flow blades extending radially outward from said rim, each said blade having a stem means extending radially inward through an opening in said rim in spaced relation thereto and being fixed to said hub structure inwardly of said rim, said blades having a tendency to vibrate in use, damper elements on opposite sides of said stem means radially inward from said rim, brackets on said hub structure inward of said rim having striking surfaces adjacent but normally spaced from said damper elements respectively to engage said elements and to damp the vibrations of said blades, and movable means closing the openings in said rim through which said stem means extend.

9. In combination in an axial flow bladed wheel adapted to be mounted for rotation about an axis to exchange force with a fluid, a hub structure having a rim, a plurality of axial flow blade means extending radially outward from said rim, each said blade means having a part thereof extending radially inward through an opening in said rim, and being secured to said hub structure at a locality inwardly of said rim, said blade means having a tendency to vibrate in use, and damper means on opposite sides of said part positioned radially inward from said rim and radially outward of said locality, said damper means on one side of said part being positioned at different radial positions from said damper means on the opposite side of said part, said damper means being adjacent but normally spaced from said hub structure to engage said structure during vibration of said blade and receive support from said structure to support said part at said radially different positions to damp said vibrations.

References Cited in the file of this patent

UNITED STATES PATENTS

| | | |
|---|---|---|
| 1,434,414 | Stoney | Nov. 7, 1922 |
| 2,436,087 | Benson | Feb. 17, 1948 |
| 2,537,739 | Chilton | Jan. 9, 1951 |